United States Patent
Boman et al.

(10) Patent No.: US 8,321,376 B2
(45) Date of Patent: Nov. 27, 2012

(54) ADDRESS RESOLVING DATABASE

(75) Inventors: Mats Boman, Frisco, TX (US); Mattias Wildeman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 12/593,626

(22) PCT Filed: Mar. 29, 2007

(86) PCT No.: PCT/EP2007/053062
§ 371 (c)(1),
(2), (4) Date: Nov. 24, 2009

(87) PCT Pub. No.: WO2008/119379
PCT Pub. Date: Oct. 9, 2008

(65) Prior Publication Data
US 2010/0076929 A1    Mar. 25, 2010

(51) Int. Cl.
*G06F 17/30* (2006.01)
(52) U.S. Cl. .................................. 707/623; 709/208
(58) Field of Classification Search .............. 707/623, 707/959, 999.01, 999.107; 709/208; 712/31
See application file for complete search history.

(56) References Cited

U.S. PATENT DOCUMENTS

| | | | |
|---|---|---|---|
| 7,330,857 B1 * | 2/2008 | Svingen et al. | 707/706 |
| 7,778,231 B2 * | 8/2010 | Ku et al. | 370/338 |
| 7,831,697 B2 * | 11/2010 | Fukushima | 709/223 |
| 7,869,425 B2 * | 1/2011 | Elliott et al. | 370/352 |
| 7,920,549 B2 * | 4/2011 | Alt et al. | 370/352 |
| 7,925,729 B2 * | 4/2011 | Bush et al. | 709/223 |
| 2004/0243596 A1 * | 12/2004 | Lillqvist et al. | 707/100 |
| 2006/0025140 A1 * | 2/2006 | Bales et al. | 455/445 |
| 2006/0101026 A1 * | 5/2006 | Fukushima | 707/100 |
| 2007/0022289 A1 * | 1/2007 | Alt et al. | 713/168 |
| 2008/0019356 A1 * | 1/2008 | Marsico | 370/352 |
| 2009/0103707 A1 * | 4/2009 | McGary et al. | 379/218.01 |
| 2011/0167154 A1 * | 7/2011 | Bush et al. | 709/224 |

FOREIGN PATENT DOCUMENTS

JP    A 2006-352641    12/2006

* cited by examiner

*Primary Examiner* — Leslie Wong

(57) ABSTRACT

A system for resolving addresses in an internet protocol based network. The system includes an address resolving master database and a plurality of slave databases. A plurality of transfer agents are each allocated to different ones of the plurality of slave databases for reading data from the master database and writing it to the slave databases. Each slave database receives and stores either ENUM data or DNS data, but not both. A plurality of applications have read access to at least one of the plurality of slave databases.

10 Claims, 4 Drawing Sheets

ADDRESS RESOLVING DATABASE

FIELD OF THE INVENTION

The invention relates to the field of routing databases in communications networks. More particularly it relates to DNS/ENUM routing databases.

BACKGROUND TO THE INVENTION

Previous routing systems incorporate a single database that accepts configuration, provisioning, analysis and query actions.

In a conventional system, as shown in FIG. 1, a server S hosts an address-resolving database. A provisioning tool PT is used to perform read/write (R/W) provisioning operations, such as maintaining the content of the database. Two DNS clients DC1 and DC2 exchange DNS queries Q with the database. The concurrent use of the database by the clients DC1, DC2, and the provisioning tool PT limits the performance of the routing system.

It is an object of the present invention to obviate at least some of the above disadvantages and to provide an improved address resolving database.

SUMMARY

According to a first aspect of the present invention, there is provided a system for resolving addresses in an internet protocol based network. The system comprises an address resolving master database and a plurality of slave databases. A plurality of transfer agents are provided, each allocated to one of the plurality of slave databases, for reading data from the master database and writing it to the slave databases. A plurality of applications have read access to at least one of the plurality of slave databases.

At least one slave database may comprise a full set of the data in the master database.

At least one of the slave databases may comprise a subset of the data in the master database.

At least one of the slave databases may comprise an identical copy of the data in the master database.

At least one of the slave databases may comprise a transformed copy of the data in the master database.

The system may further comprise at least one master application interfacing with the master database and capable of reading and writing data to the master database.

At least one of the transfer agents may be configured to transfer ENUM data from the master database to at least one of the slave databases.

At least one of the slave applications may be an ENUM application.

At least one of the transfer agents may be configured to transfer DNS data from the master database to at least one of the slave databases.

At least one of the slave applications may be a DNS application.

The system may further comprise a master application for maintaining the content of the master database.

The system may further comprise at least one protocol server for co-hosting at least one of the transfer agents, the slave database allocated thereto, and at least one slave application.

The system may further comprise at least one slave database server for hosting one of the slave databases and at least one protocol server for hosting a slave application separately from the corresponding slave database.

The system may further comprise a plurality of slave database servers for hosting one of the slave databases and a plurality of protocol servers for hosting a slave application separately from the corresponding slave database, wherein at least one of the slave applications has read access to the plurality of slave databases hosted separately.

At least one of the slave applications may be configured to receive queries from a plurality of application clients.

According to a second aspect of the present invention there is provided a storage server for hosting a master database for resolving addresses in an internet protocol based network. The storage server comprises an address resolving master database and at least one master application interfacing with the master database and capable of reading and writing data to the master database.

The storage server may further comprise at least one transfer agent allocated to a slave databases, for reading data from the master database and writing it to the slave database.

At least one of the transfer agents may be configured to transfer ENUM data from the master database to at least one of the slave databases.

At least one of the transfer agents may be configured to transfer DNS data from the master database to at least one of the slave databases.

At least one master application may be configured for maintaining the content of the master database.

According to a third aspect of the present invention there is provided a protocol server for hosting an application for resolving addresses in an internet protocol based network.

The protocol server may comprise at least one application having read access to at least one of a plurality of slave databases;

The protocol server may further comprise at least one slave database; at least one transfer agent, allocated to one of the at least one slave database(s), for reading data from the master database and writing it to the slave database.

At least one slave database may comprise a full set of the data in the master database.

At least one of the slave databases may comprise a subset of the data in the master database.

At least one of the slave databases may comprise an identical copy of the data in the master database.

At least one of the slave databases may comprise a transformed copy of the data in the master database.

At least one of the transfer agents may be configured to transfer ENUM data from the master database to at least one of the slave databases.

At least one of the slave applications may be an ENUM application.

At least one of the transfer agents may be configured to transfer DNS data from the master database to at least one of the slave databases.

At least one of the slave applications may be a DNS application.

The protocol server may be configured for co-hosting at least one of the transfer agents, the slave database allocated thereto, and at least one slave application.

At least one of the slave applications may be configured to receive queries from a plurality of application clients.

According to a fourth aspect of the present invention there is provided a server for hosting a slave database for resolving addresses in an internet protocol based network. The server comprises at least one slave database.

The at least one slave database may comprise a full set of the data in the master database.

At least one of the slave databases may comprise a subset of the data in the master database.

At least one of the slave databases may comprise an identical copy of the data in the master database.

At least one of the slave databases may comprise a transformed copy of the data in the master database.

At least one of the slave databases may comprise ENUM data.

At least one of the slave databases may comprise DNS data.

The present invention allows the processing load imposed by read operations on a particular slave database to be isolated from the master database and other slave databases.

The processing load imposed on the master database during read/write operations may be isolated from the slave databases.

The slave databases may be easily restored from the master database in case of slave database corruption or error. This could relax the requirements on the slave database for availability and data retainability, allowing for low complexity (cost) slave databases to be used.

The present invention allows for corruption or errors in the slave database not to be propagated to the master database or the other slave servers, since the transfer agent only transfers data from the master to the slave databases.

Both applications and slave databases may seamlessly be added or removed from the system.

The centralized storage of all data in the master database allows for atomic, transaction safe backup/restore procedures.

The centralized storage of all data in the master database allows for easy data restore, on both master and slave databases, in case of master database corruption or error.

The way the data is structured may be different in the master database and the slave databases and between slave databases. This allows the data structure in a particular database to be tailored to the application that is using it. E.g. the master database may be structured for provisioning performance while the slave database may be structured for query performance.

The data security of the system may be improved since a slave database may contain only a subset of the entire dataset. A security breach of that particular slave database may thus only expose the data that was available in the slave database.

Denial of Service attacks on a particular protocol server may only affect that particular protocol server; the other parts of the system will be protected.

Database redundancy and load sharing may be realized since one application may connect to several databases.

Cost savings and database size scalability are enabled since several applications may be connected to a single, large database.

The physical distance and connection quality dependency may be reduced since provisioning writes terminate in the master database and query reads terminate in the slave database.

DETAILED DESCRIPTION

The present invention proposes dividing the earlier monolithic system into a set of logical entities. The new system splits the earlier monolithic database into two logical parts. In the first part a master database is accessed by the operator of the system and used for configuration, provisioning and analysis. In the second part, at least one, but preferably several, slave databases receive their data from the master database and that are used for client query actions. The master database contains the entire dataset of the system. The slave databases may contain the full or partial dataset of the master database. The applications for performing configuration, provisioning, analysis and querying are also separated from their respective databases.

Figure 1:
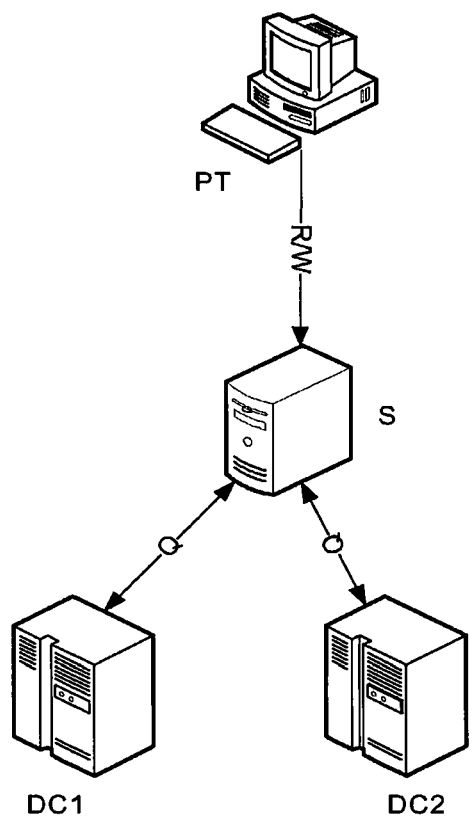
FIG. 1 illustrates schematically a conventional database structure.
Figure 2:
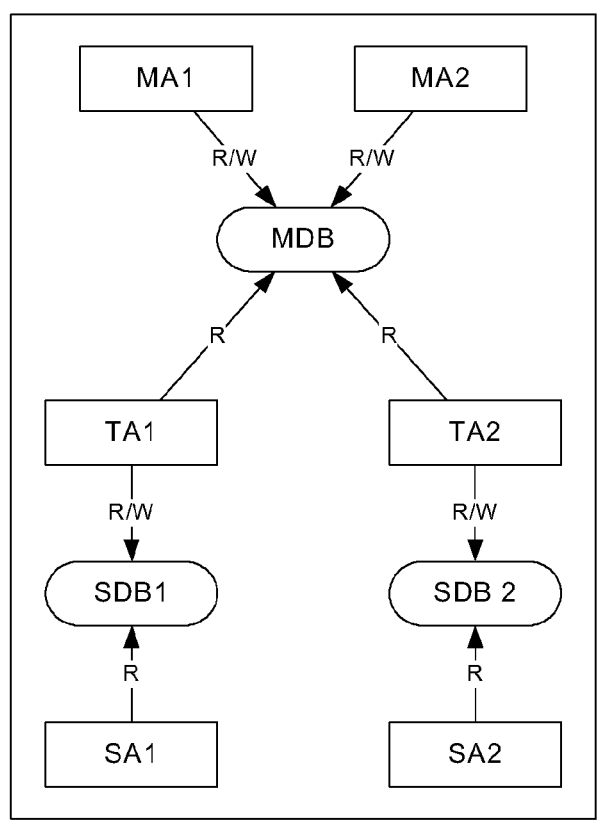
FIG. 2 illustrates schematically a database server structure in accordance with the invention.

The system consists of a number of logical entities that have different roles, as shown in FIG. 2. The system boundary is indicated as a dotted line.

In the context of the present invention, an "application" is a computer program that interacts with its clients and with the database. It implements an interface towards the clients and an interface towards a database, either master or slave.

A "master application" MA is an application that interfaces with the master database and it may both read (R) and write (W) data to the master database.

A "slave application" SA is an application that interfaces with one or more slave databases. It primarily reads (R) from the dataset that has been transferred from the master database to the slave database. It may optionally write (W) to the master dataset in the slave database, but such changes are not propagated back to the master database by the transfer agent.

The "master database" MDB is a single, unified database containing the entire dataset of the system.

The "slave database" SDB is a database that contains a full set or subset of the data in the master database. The data in the slave database may be an identical copy or a transformed copy of the data in the master database MDB.

The "transfer agent" TA is a computer program that reads data (R) from the master database MDB and subsequently writes it (W) to the slave database SDB. In the transfer process, the transfer agent TA may perform data transformation on the data before writing it to the slave database SDB. The transfer agent TA is also responsible for selecting what data should be transferred from the master database MDB to the slave database SDB.

A "protocol server" PS is the physical realisation of an application. It consists of a computer that is running application server program (e.g. ENUM Server) (see FIG. 3 and FIG. 4). The slave database SDB may optionally be co-located on the protocol server PS FIG. 3).

The "storage server" SS is the physical realisation of the master database MDB. It consists of one or several computers running the master database program. An application server may optionally be co-located with the storage server (e.g. Storage Server Application SSA) (see FIG. 3 and FIG. 4).

Figure 3:
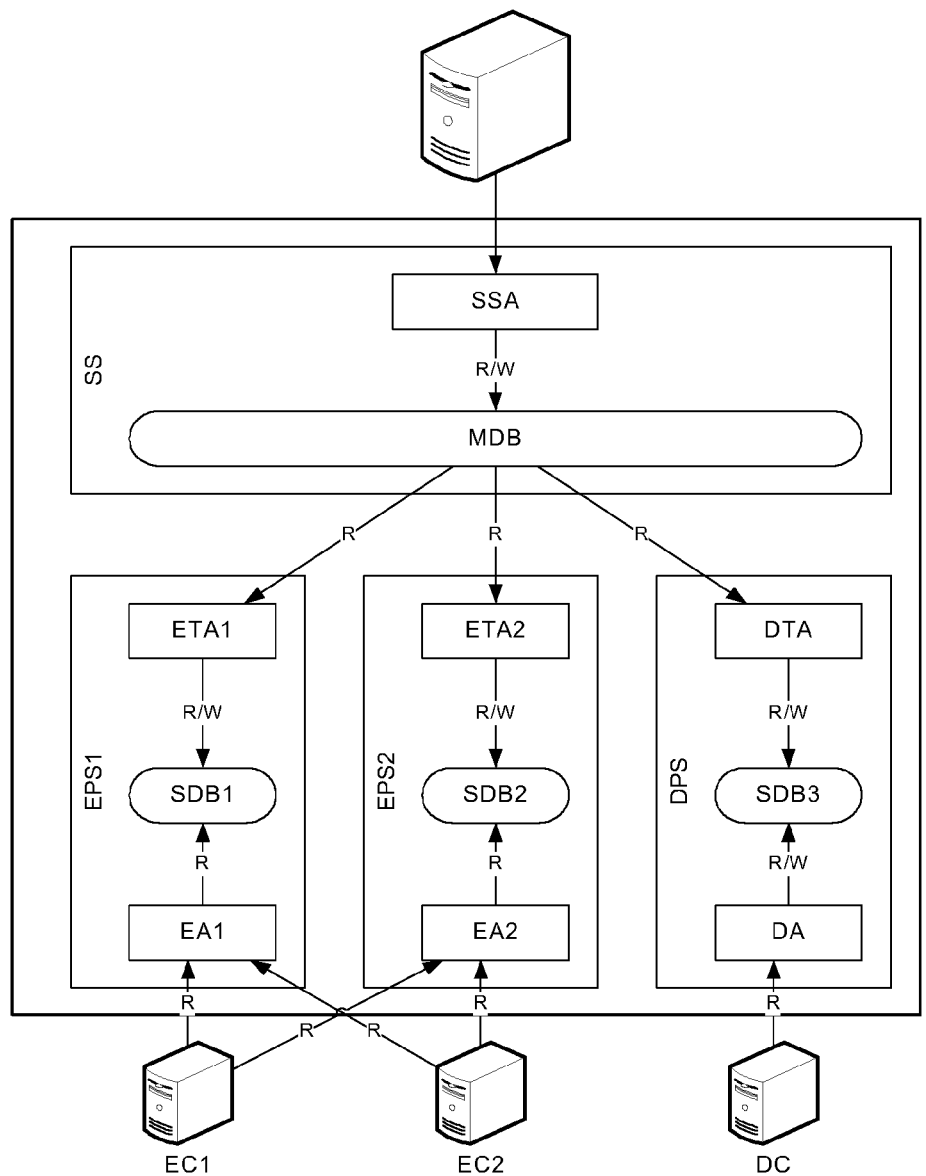
FIG. 3 illustrates schematically a database structure with co-hosting of databases and applications.

FIG. 3 depicts one physical realization of the system, wherein at least one of the slave databases SDB and at least one of the slave applications SA are co-hosted on the same protocol server.

In this physical realization, the slave database SDB, transfer agent TA and enum application EA has been co-located on the same host. Multiple ENUM protocol server hosts EPS1, EPS2 and multiple connections to the ENUM clients EC1, EC2 are deployed in the system to provide redundant operation for ENUM. The slave databases SDB1, SDB2 on the enum protocol servers store only the dataset related to ENUM. A DNS protocol server DPS is also deployed, and it stores only the dataset that is related to DNS in its slave database SDB3. For query performance, the slave databases SDB1, SDB2, SDB3 are preferably implemented as RAM databases.

The master database MDB and storage server application SSA are advantageously co-located on the same host, the storage server SS. The external provisioning/configuration and analysis system is connected to the storage server SS and allows the operator to control the full dataset of the system.

The clients EC1, EC2, DC of the system are connected to their respective protocol server EPS1, EPS2, DPS.

The transfer agents ETA1, ETA2, DTA transfer the relevant data from the master database MDB to the slave databases SDB1. SDB2, SDB3.

Moreover, at least one of the slave databases SDB1, SDB2, SDB3 may be hosted on physically separate servers SDBH1, SDBH2 from the protocol servers EPS1, EPS2 hosting at least one of the slave applications EA1, EA2.

The storage server application SSA may provide a system for provisioning, configuration, and analysis of ENUM, DNS, and/or DHCP data. Accordingly the slave databases may comprise ENUM, DNS, and/or DHCP data.

Figure 4:
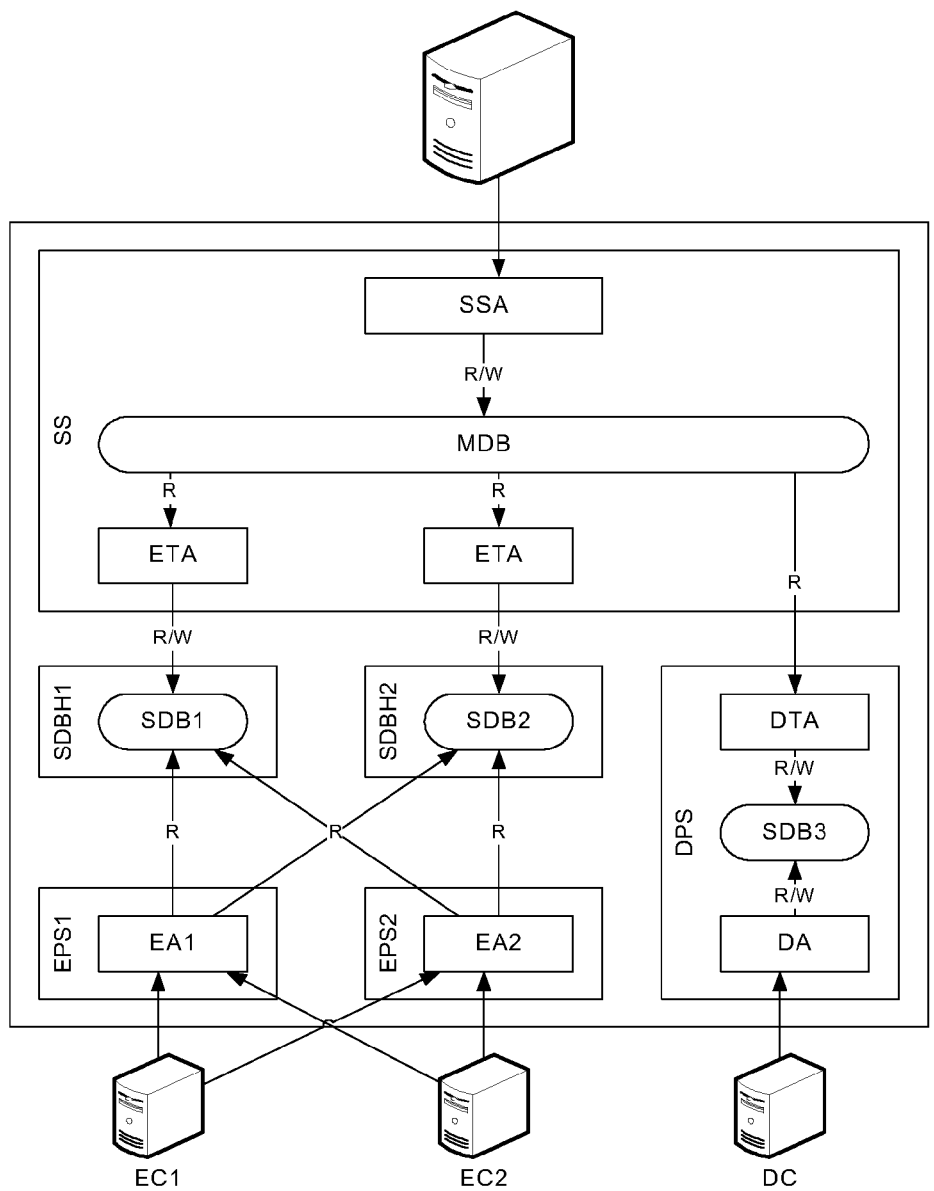
FIG. 4 illustrates schematically a database structure with separate hosting of databases and applications.

In the realisation illustrated in FIG. 4, the ENUM slave databases SDB1, SDB2 are not co-located on the same host as the ENUM application. This adds the benefit of supporting a scalable slave database, which may be scaled over several hosts in order to achieve a larger database, improved redundancy and general improvements in characteristics.

Moreover, with particular reference to FIG. 4, it is understood that any suitable combination of co-hosted databases and corresponding applications (e.g. DNS) with separately hosted databases and applications (e.g. ENUM) is possible.

In one example, the present invention as shown in FIGS. 3 and 4 may be applied to a source based routing (SBR) database to provide ENUM and DNS translation to SIP URI based on a multi-server based hierarchy. The SBR can also return translated numbers instead of or in addition to the SIP URI. This service is common to all call servers and management systems that wish to obtain a translation of URI to/from E.164 numbers and to determine the Call Server domain name for the call server that owns the user data.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A system for resolving addresses in an Internet Protocol (IP) based network, said system comprising:
an address resolving master database configured to store both ENUM data and DNS data;
a plurality of slave databases configured to store data received from the master database for resolving address queries from a plurality of slave applications; and
a plurality of transfer agents, each allocated to one of the plurality of slave databases, configured to read data from the master database, and to write the data from the master database to the slave databases, wherein one of the transfer agents is configured to transfer only the ENUM data from the master database to a first one of the slave databases, and another of the transfer agents is configured to transfer only the DNS data from the master database to a second one of the slave databases;
wherein the plurality of slave applications include an ENUM slave application and a DNS slave application, wherein the ENUM application is configured to access only the first slave database when performing an address query, and the DNS application is configured to access only the second slave database when performing an address query; and
wherein the plurality of slave applications are thereby enabled to more efficiently resolve address queries.

2. The system according to claim 1, wherein at least one slave database comprises a full set of the data in the master database.

3. The system according to claim 1, wherein at least one of the slave databases comprises an identical copy of the data in the master database.

4. The system according to claim 1, further comprising at least one master application interfacing with the master database and capable of reading and writing data to the master database.

5. The system according to claim 1, further comprising at least one protocol server for co-hosting at least one of the transfer agents, one of the slave database allocated thereto, and at least one slave application.

6. The system according to claim 1, further comprising:
at least one slave database server for hosting one of the slave databases; and
at least one protocol server for hosting a slave application separately from a corresponding slave database.

7. The system according to claim 6, further comprising:
a plurality of slave database servers for hosting one of the slave databases; and
a plurality of protocol servers for hosting a slave application separately from a corresponding slave database, wherein at least one of the slave applications has read access to the plurality of slave databases hosted separately.

8. The system according to claim 1, wherein at least one of the slave applications is configured to receive queries from a plurality of application clients.

9. A protocol server for hosting an application for resolving addresses in an Internet Protocol (IP) based network, wherein the protocol server has access to an address resolving master database configured to store both ENUM data and DNS data, said protocol server comprising:
a slave database configured to store data received from the master database;
a slave application having read access to said slave database for performing an address query, wherein the slave application is either an ENUM application or a DNS application; and
a transfer agent allocated to the slave database configured to read either ENUM data or DNS data, but not both, from the master database, and to write the data from the master database to the slave database, wherein the transfer agent is configured to read and write only ENUM data when the slave application is an ENUM application, and to read and write only DNS data when the slave application is a DNS application;
wherein the slave application is thereby enabled to more efficiently resolve address queries.

10. The protocol server according to claim 9, wherein the slave application is configured to receive queries from a plurality of application clients.

* * * * *